Feb. 3, 1953 S. C. SOMERS 2,627,278
ANTISIPHON VALVE
Filed June 28, 1951

INVENTOR
SHIRLEY C. SOMERS
BY
ATTORNEY

Patented Feb. 3, 1953

2,627,278

UNITED STATES PATENT OFFICE 2,627,278

ANTISIPHON VALVE

Shirley C. Somers, Los Angeles, Calif.

Application June 28, 1951, Serial No. 233,985

2 Claims. (Cl. 137—218)

This invention relates to an anti-syphon valve.

Figure 1:
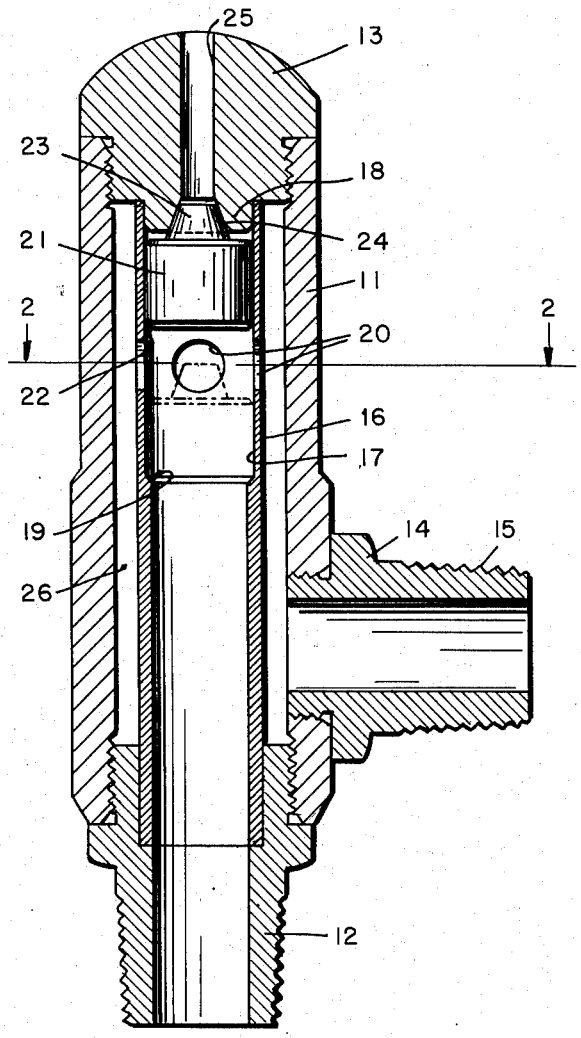
Figure 2:
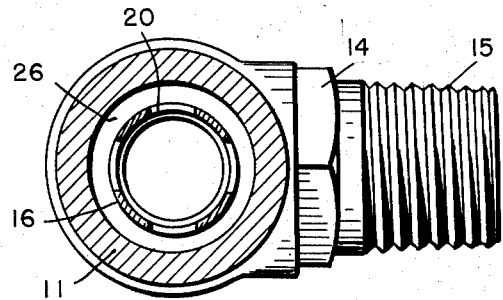

One object of the invention is to provide a valve which will prevent the creation of a vacuum in a pipeline. Another object is to provide an anti-syphon valve which is simple and inexpensive to construct and which has no parts which rapidly deteriorate with age. A further object is to provide an anti-syphon valve constructed of all metal parts. These and other objects are attained by my invention which will be understood from following description reference being made to the accompanying drawing in which Fig. 1 is a longitudinal cross-sectional view of one form of my invention. Fig. 2 is a cross-sectional view taken on the line 2—2 of Fig. 1.

Referring to the drawings, my anti-syphon valve consists of an elongated tubular casing 11 which is provided with a threaded inlet plug 12, a threaded air-vent plug 13 at the opposite end, and a threaded outlet fixture 14 which is disposed in the side wall of said casing 11 at a position intermediate the inlet plug 12 and air-vent plug 13. The outlet fixture 14 is preferably provided with external threads 15 by which the valve may be connected to the pipeline. The threaded inlet plug 12 is also provided with external threads to permit its connection in the pipeline in which the valve is to be installed. A valve tube 16 is mounted between the inlet plug 12 and the vent-plug 13, the inlet plug being provided with a cylindrical recess 17 in which the end of the tube 16 fits. The air-vent plug 13 is provided with a boss 18, around which the valve tube 16 fits and by which it is held in place. The valve tube 16 is provided with a conical valve seat 19 at a point substantially midway between the inlet plug end and air-vent end of the said tube, and ports 20 are provided in the tube 16 intermediate the valve seat 19 and the air-vent end of the tube. A cylindrical piston 21 is provided for reciprocation between the valve seat 19 and the boss 18 on the air-vent plug 13, the piston being fitted accurately to that portion of the interior cylindrical wall of the valve tube 16. The piston 21 is provided on its lower edge with a taper 22 which is ground to fit the conical face of the valve seat 19. The end of the piston opposite the taper 22 is provided with a tapered protrusion 23 which is adapted to fit a corresponding conical opening 24 in the inside end of the air-vent plug 13, this opening being connected to the tubular opening 25 which constitutes the vent for air above the piston 21.

The operation of my anti-syphon valve will be apparent from the above description. When water or other liquid under pressure enters the opening in the inlet plug 12, it forces the piston 21 to the upper end of the valve tube 16 sealing off the air-vent opening 25 by the seating of the tapered portion 22 in the conical opening 24. With the piston in this position, the water flows freely from the inside of the valve tube 16 through the ports 20 into the concentric passageway 26 and out through the outlet fixture 14. When the pressure on the incoming liquid drops below the pressure at the air vent 25, the piston 21 moves into position against the valve seat 19, thus closing off the inlet portion of the valve of tube 16, so that any back pressure liquid or any liquid reversing its flow through the outlet fixture 14 will not be syphoned into the pipe line to which the inlet plug 12 is connected. When the pressure of the liquid in the inlet-line is again increased above atmospheric pressure, or above the air pressure at the air vent, the piston 21 moves to the upper position and again permits liquid to flow through the ports 20.

The advantages of my anti-syphon valve are its simplicity of construction, its freedom from any gaskets or other parts which may deteriorate, and in the certainty of the operation. The parts are easily assembled from automatic machine made parts and standard pipe fixtures.

I claim:

1. An anti-syphon valve comprising a casing having an elongated cavity, with an inlet port at one end, an air vent opening at the opposite end, and an outlet port in the side of said casing intermediate the ends thereof; an apertured inlet plug attached to said casing at the inlet port, said plug having a concentric recess in the aperture at the inner end; an apertured air vent plug attached to said casing at the air vent opening thereof, said plug having a conical seat for said piston at its inner end; a valve tube mounted between said inlet and said air vent and forming an annular cavity in said casing, said valve tube having a conical valve seat formed in the wall thereof at a position intermediate its ends; and a slidable piston adapted to slide in said valve tube between said conical valve seat in said tube and said air vent, said slidable piston being provided at one end with a taper adapted to fit said conical valve seat in said tube when the valve is closed, and said piston at the other end being provided with seating means adapted to fit said conical seat in said air vent plug; said valve tube being provided with ports leading into said annular cavity in said casing, said ports being positioned so that they are not obstructed when said piston is in either end of its movement in said tube.

2. An anti-syphon valve comprising a casing having an elongated cavity, with an inlet port at one end, an air vent opening at the opposite end, and an outlet port in the side of said casing intermediate the ends thereof; an apertured inlet plug threadedly attached to said casing at the inlet port, said plug having a concentric recess in the aperture at the inner end; an apertured air vent plug threadedly attached to said casing at the air vent opening thereof, said plug having a cylindrical boss on the inside end, said boss having a conical seat at the inner end thereof; a valve tube mounted between said inlet and air vent plugs and forming an annular cavity in said casing, said tube at one end fitting into the concentric recess of said inlet plug and at the other end over said cylindrical boss, said valve tube having a conical valve seat formed in the wall thereof at a position intermediate its ends; and a slidable piston adapted to slide in said valve tube between said conical valve seat in said tube and the conical valve seat on said air vent plug boss, said slidable piston being provided at one end with a taper adapted to fit said conical valve seat in said tube when the valve is closed, and said piston at the other end being provided with a taper adapted to fit said conical valve seat on the boss of said air vent plug; said valve tube being provided with ports leading into said annular cavity in said casing, said ports being positioned so that they are not obstructed when said piston is in either end of its movement in said tube.

SHIRLEY C. SOMERS.

REFERENCES CITED

The following references are of record in the file of this patent:

UNITED STATES PATENTS

| Number | Name | Date |
|---|---|---|
| 952,299 | Bilbrey | Mar. 15, 1925 |
| 1,555,934 | Barker | Oct. 6, 1925 |